(No Model.) 9 Sheets—Sheet 1.

H. S. HOPPER.
BARREL LATHE.

No. 548,548. Patented Oct. 22, 1895.

WITNESSES.
G. W. Rea
Thos. A. Green

INVENTOR.
Henry S. Hopper.
by James L. Norris.
Attorney.

(No Model.) 9 Sheets—Sheet 2.
H. S. HOPPER.
BARREL LATHE.

No. 548,548. Patented Oct. 22, 1895.

Fig. 3.

WITNESSES.
G. W. Rea
Thos. A. Green

INVENTOR.
Henry S. Hopper.
by James L. Norris
Attorney.

(No Model.)  9 Sheets—Sheet 3.

H. S. HOPPER.
BARREL LATHE.

No. 548,548. Patented Oct. 22, 1895.

Fig. 4.

WITNESSES.
G. W. Rea.
Thos. A. Green

INVENTOR.
Henry S. Hopper.
by James L. Norris.
Attorney.

(No Model.) 9 Sheets—Sheet 5.

H. S. HOPPER.
BARREL LATHE.

No. 548,548. Patented Oct. 22, 1895.

WITNESSES.
G. W. Rea,
Thos. A. Green

INVENTOR.
Henry S. Hopper.
By James L. Norris.
Attorney.

(No Model.) 9 Sheets—Sheet 7.

H. S. HOPPER.
BARREL LATHE.

No. 548,548. Patented Oct. 22, 1895.

WITNESSES.
G. W. Rea.
Thos. A. Green

INVENTOR.
Henry S. Hopper.
by James L. Norris.
Attorney.

United States Patent Office.

HENRY S. HOPPER, OF DETROIT, MICHIGAN.

BARREL-LATHE.

SPECIFICATION forming part of Letters Patent No. 548,548, dated October 22, 1895.

Application filed May 10, 1894. Serial No. 510,812. (No model.)

*To all whom it may concern:*

Be it known that I, HENRY S. HOPPER, a citizen of the United States, residing at Detroit, in the county of Wayne and State of Michigan, have invented new and useful Improvements in Barrel-Lathes, of which the following is a specification.

This invention relates to the manufacture of barrels and cooperage generally, particularly that type of slack barrels used for shipping flour, sugar, produce, and other material or articles.

The chief objects of my invention, concisely stated, are to provide a new and improved machine of the character alluded to for making barrels and the like complete at one operation, and for making slack barrels with metallic hoops, whereby the various steps of windlassing, trussing, leveling, chamfering, crozing, and attaching metal bilge-hoops are effected in a perfect manner in one machine by simplified and accurately-working mechanical devices.

To accomplish these objects my invention consists in the combination or arrangement of parts hereinafter described and claimed, reference being made to the accompanying drawings, in which—

Similar reference-numerals indicate corresponding parts.

The essential features of the invention are a setting-up form or chuck 1, bell-shaped contractor 2, cutter-head 3, and means for operating the same.

The setting-up form or chuck 1 is provided with shoulders or recesses 4, 5, and 6 upon its interior surface, adapted to hold in position the truss-hoops 7, 8, and 9, and is journaled so as to rotate freely upon the rocking yoke 10, which is provided with trunnions 11 11, journaled in nuts 12 12, supported by the vertical screws 13 13, to which are attached the worm-gears 14.

The numeral 15 indicates a horizontal shaft having attached worms 16, engaging worm-gears 14, and also provided with driving-pulleys 17 and 18, driven by belts 19 and 20 from the loose pulleys 21 and 22 on the main driving-shaft 23, the belt 19 being straight and the belt 20 crossed. A friction-wheel 24, mounted upon the main driving-shaft 23, between the loose pulleys 21 and 22, is movable lengthwise of the shaft, but revolves therewith and engages frictionally with either of the loose pulleys 21 and 22 to transmit motion to the worm-shaft 15. A hand-lever 25 is attached to a rocking shaft 26, journaled on the frame of the machine and having cranks 27, provided with set-screws, which enter the groove in the friction-wheel 24 for moving the latter into engagement with either of the loose pulleys 21 and 22, as desired.

The belts 19 and 20 are stationary, except when it is desired to change the position of the chuck 1. Hence the position of said chuck may be changed by hand, if desired, by grasping one of the belts and drawing it in the direction desired. It is evident that whenever either of the loose pulleys 21 or 22 is brought into contact with the friction-wheel 24 the other one will revolve in the opposite direction at the same time by reason of the crossed belt.

Figures 5, 6:
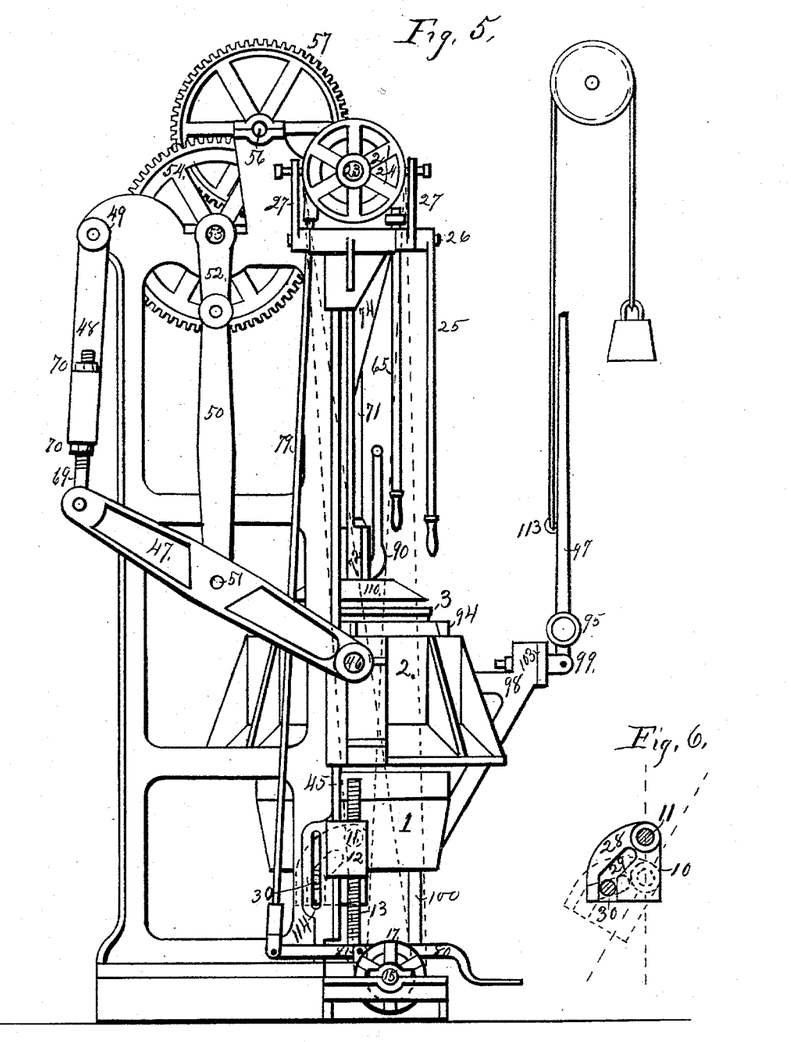
Fig. 5 is an end elevation of the machine.
Fig. 6 is a detail view showing one end of the rocking yoke and guide-plate hereinafter explained, the dotted lines indicating the position of the same when the barrel is being removed.
Figure 7:
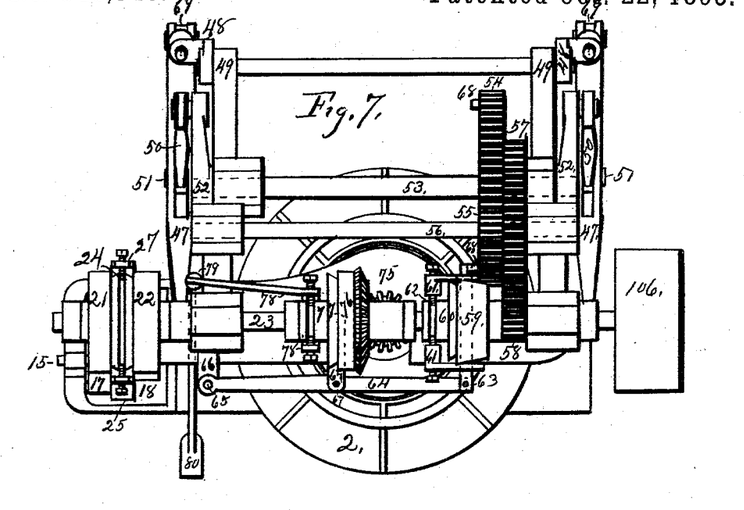
Fig. 7 is a top plan view of the machine.

Guide-plates 28, rigidly attached to the ends of the rocking yoke 10, are provided with cam-shaped slots 29, and guide pins or studs 30, rigidly attached to the frame of the machine, engage the slots 29 in the guide-plates 28 for holding the rocking yoke 10 and chuck 1 in a vertical position during part of their vertical motion and at another part of their motion causing them to incline from a vertical position, Fig. 6, in order to remove the completed barrel.

The vertical shaft 31, to which the chuck 1 is attached, is made hollow at its upper end and the sliding bolt 32 is inserted therein. The sliding bolt 32 is provided with the handle 33 and the spider 34, which is in turn connected by the links 35 with the segments 36, pivoted at their lower ends to the chuck 1 to form a collapsible central support adapted to hold the staves in position at the inside of the bilge, while they allow the barrel to be removed when completed.

Figure 10:
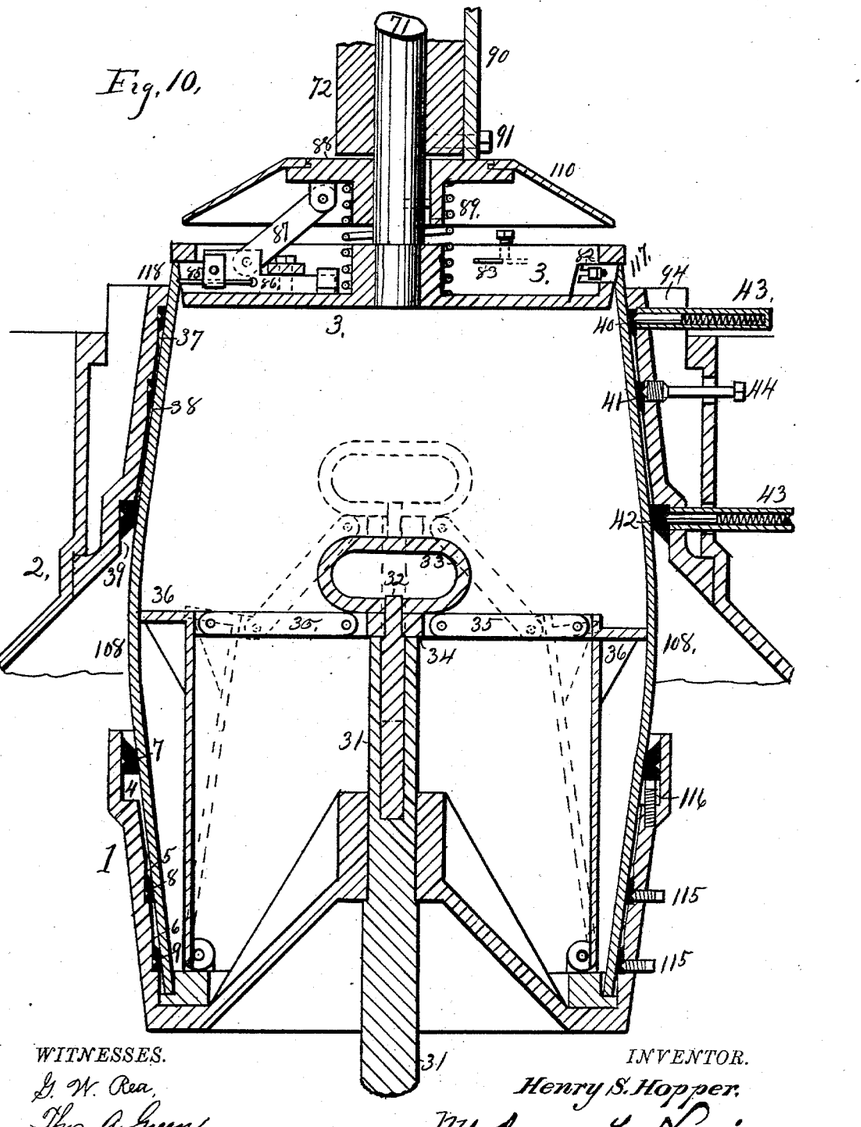
Fig. 10 is an enlarged detail vertical central sectional view through the barrel, showing the cutter-head, the bell-shaped contractor, and the setting-up form or chuck.

The bell-shaped contractor 2 is provided with recesses or grooves 37, 38, and 39 upon its interior surface, adapted to receive the truss-hoops 40, 41, and 42, which are held in their respective places by the spring-latches 43 and set-screws 44, Fig. 10. The spring-latches 43 and set-screws 44 are interchangeable.

The bell-shaped contractor 2 is adapted to slide upon vertical guides 45 on the frame of the machine, and is provided with trunnions 46, which engage one end of the side levers 47. The opposite ends of the side levers 47 are pivotally connected with a swinging frame 48, which is pivotally mounted on the frame of the machine, as at 49. 50 50 are connecting-rods coupling the side levers 47 at about their centers, as at 51, with the cranks 52 of the crank-shaft 53. The spur-gear 54 is also attached to the crank-shaft 53 and engages the pinion 55 on an intermediate shaft 56, carrying a spur-gear 57, engaging a loose pinion 58 on the main driving-shaft 23. The loose pinion 58 is provided with a friction-flange 59, adapted to engage with a friction-clutch section 60, adapted to revolve with but slide along the shaft 23 and controlled by a shifter 61, which engages it at the groove 62. The shifter 61 is hinged at its lower end to the frame of the machine, and is provided with a sliding bolt 63, connected at one end by a lever 64 with a hand-lever 65, fulcrumed on the frame of the machine, as at 66. The connecting-lever 64 is also connected at about its center to the frame of the machine by the link 67. The opposite end of the sliding bolt 63 projects beyond the shifter and is adapted to come in contact with the stops or cams 68 on the gear-wheel 54 when the bell-shaped contractor has reached the limit of its travel, either up or down, to disengage the friction-clutch 60.

69 69 are eyebolts passing through the swinging frame 48, held in place by the nuts 70 70, and pivotally connected to the side levers 47 to form an adjustable fulcrum therefor.

The cutter-head 3 is attached to the lower end of a vertical shaft 71, journaled, as at 72 and 73, upon the hanger 74 and rotated by the bevel-pinion 75, attached to its upper end and engaging the loose bevel-gear 76 on the main driving-shaft 23. The loose bevel-gear 76 is adapted to engage the friction-clutch 77, which revolves with the shaft 23 and is adapted to slide lengthwise thereof and be controlled by a shifter 78, fulcrumed at one end on the frame of the machine and connected at its other end by the rod 79 to the foot-lever 80, which in turn is fulcrumed on the base of the machine, as at 81. The hanger 74 is small enough to allow the bell-shaped contractor 2 to encircle it while passing to and from its upper position, which is far enough above the cutter-head 3, which it also encircles, to be entirely out of the way of the operator. In the cutter-head, Figs. 10, 11, and 12, 82 indicates the chamfering-knife, 83 jointing or leveling knives attached directly to the cutter-head, and 84 and 85 crozer-knives secured in inclined slots in the reciprocating tool-block 86, which is connected by the link 87 to the sliding flange 88 on the cutter-head shaft 71. The sliding flange 88 is supported upon the spiral spring 89, which holds the reciprocating tool-block 86, with its crozer-knives 84 and 85, at its innermost position, where the knives will not come in contact with the staves of the barrel.

90 is a cam-lever fulcrumed upon the hanger 74 at 91, and adapted to press down the sliding flange 88, and thereby force the reciprocating tool-block 86 outward, with the knives 84 and 85, into contact with the end of the barrel to form the croze.

92 is a counterbalance-weight attached to the bell-crank lever 93, which engages the reciprocating tool-block 86 for the purpose of counteracting the outward thrust upon said tool-block, due to centrifugal force, when the cutter-head is rotated.

94 is a removable bushing inside of and a part of the bell-shaped contractor 2, for the purpose of facilitating the changing of the machine from one size barrel to another.

95 is a hoop-driving roller attached to a spindle 96, journaled in a driver-lever 97, fulcrumed on the swinging bracket 98 at 99. The swinging bracket 98 is supported upon the post 100 and is adjustable vertically by the set-collars 101. The post 100 is held in place by the brace 102, attached to the frame of the machine.

103 is a swivel-joint in the swinging bracket 98 and adapted to adjust the driver-roller at the proper angle to the surface of the barrel. 104 is a spring attached to the driver-lever 97 and bearing against the outer end of the roller-spindle 96 for the purpose of holding the driver-roller against the surface of the barrel with a yielding pressure, and adapted to permit the roller to follow the contour of the barrel, which is never exactly round, without moving the lever 97.

105 is a set-collar attached to the spindle 96.

Figures 8, 9:
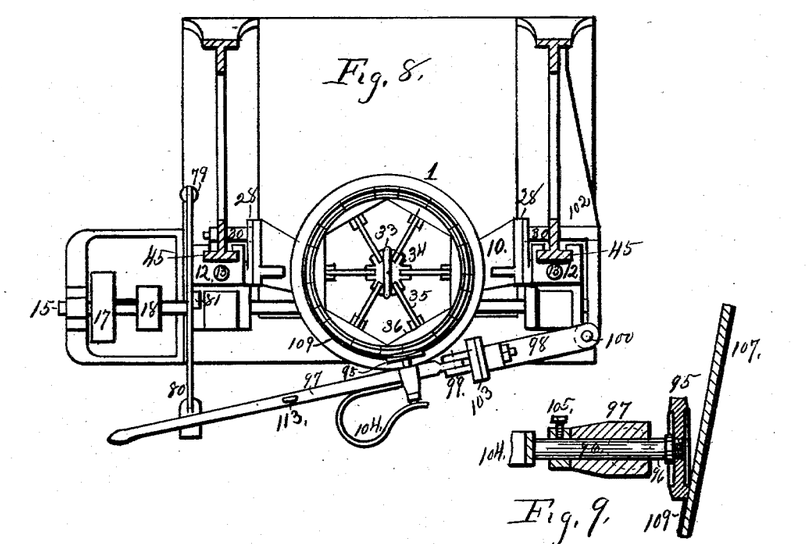
Fig. 8 is a horizontal sectional view taken on a line directly above the barrel being made, showing the hoop-roller in position for driving the hoop on the barrel.
Fig. 9 is a detail sectional view on a larger scale, showing the hoop-driver and a portion of a stave with the hoop-driver roller in position on the edge of the hoop.

In Fig. 9 the hoop-driving roller 95, with its spindle 96 and support 97, are shown in an enlarged section with the roller in position against the side of the barrel and resting upon the upper edge of the permanent metallic hoop 109. In shape the driving-roller is a disk provided with a flange projecting slightly beyond its surface and having a narrow tread at its extremity, which is at an angle to said surface and is adapted to press against the side of the barrel just above the hoop, but at no other point. The circumference of the disk is grooved or hollowed out so as to form a right angle with the bevel tread at the point or corner where it rests upon the hoop. This construction allows the corner of the tread and circumference to follow the hoop and barrel closely without digging into the staves, as would a plain square-cornered disk. The hoop-driver roller 95 is made alike upon both sides, and is screwed upon the spindle 96 in such a manner that it may be reversed when the side in use becomes worn.

106 is a driving-pulley attached to the main driving-shaft.

107 are staves of the barrel as set up in the chuck.

The dotted lines 108 indicate the position of the staves after they are drawn together in the form of a barrel.

109 indicates the permanent bilge-hoop in place. A guard 110 is attached to the sliding flange 88 for preventing the hoops 111 from catching upon the cutter-head 3 and for protecting the hands of the operator from injury.

A hook 112 is attached to the frame of the machine, and upon this hook the permanent bilge-hoops 111 are suspended until required to be driven upon the barrel.

The hoop-driver lever 97 is provided with an eye 113, to which a rope may be attached leading over suitable pulleys or sheaves to a counterweight adapted to hold the lever in a vertical position when not in use.

The guide pin or stud 30 is secured in slots 114 in the frame of the machine for adjusting the height of the chuck 1 for different-sized barrels.

The chuck 1 is provided with set-screws 115 to hold such truss-hoops in place in the chuck as are not to remain upon the barrel. The set-screws 116 on the interior of the chuck 1 are adapted to vary the position of the truss-hoop 7 for the purpose of varying the size of the barrel within certain limits when setting up the same.

Figures 1, 2:
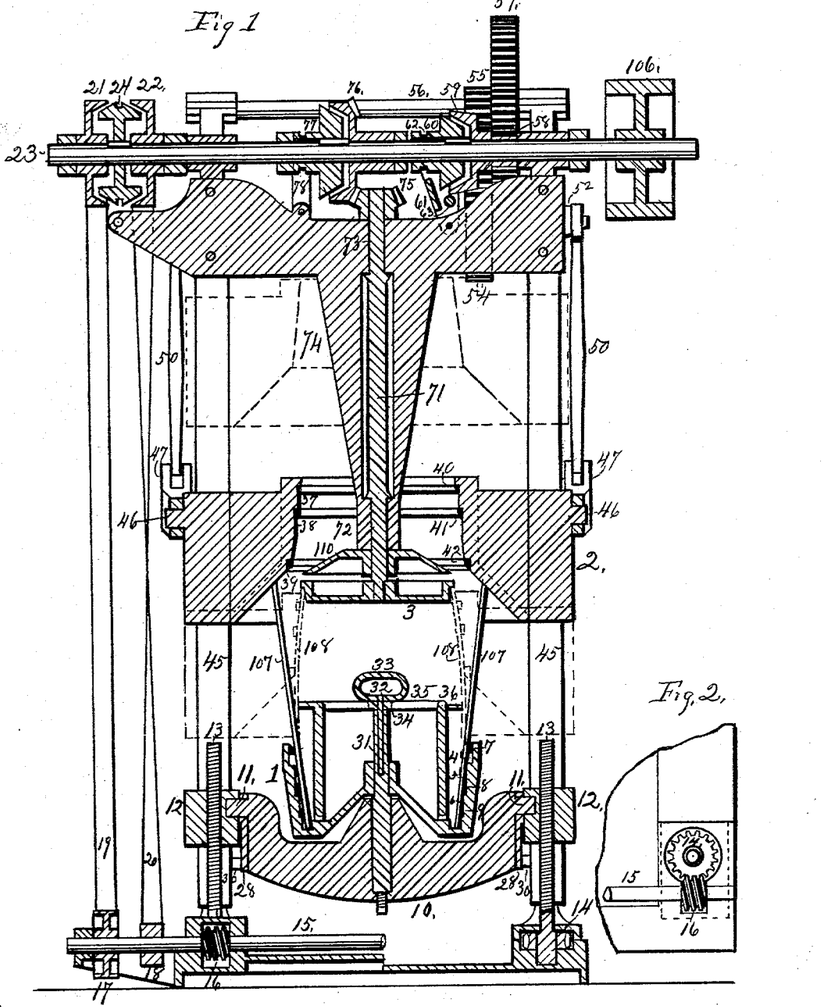
Figure 1 is a vertical sectional view of the machine, the line of section being through the main driving-shaft and the center of the barrel being made.
Fig. 2 is a detail plan view of a portion of the bed-plate of the machine, showing one of the worms and worm wheel or gear for operating the vertical screws.

In Fig. 1 the bell-shaped contractor 2 is shown only part way down—that is, at the point where it first strikes the ends of the staves. The lower dotted outline 107 indicates the position of the contractor at the lower end of its travel, with the staves of the barrel drawn together within the truss-hoops 41, 42, and 40. The upper dotted lines show its position when at the upper limit of its stroke. It is shown in this position in Figs. 3 and 4 and at its lower position in Figs. 5, 10, and 12. A sand belt or band 119 is attached at one end to the brace 102 and to a handle 120 at its opposite end, whereby the belt or band may be brought into contact with the surface of the barrel. In operating, the main driving-shaft 23 is constantly rotated by a belt on pulley 106.

Figure 3:
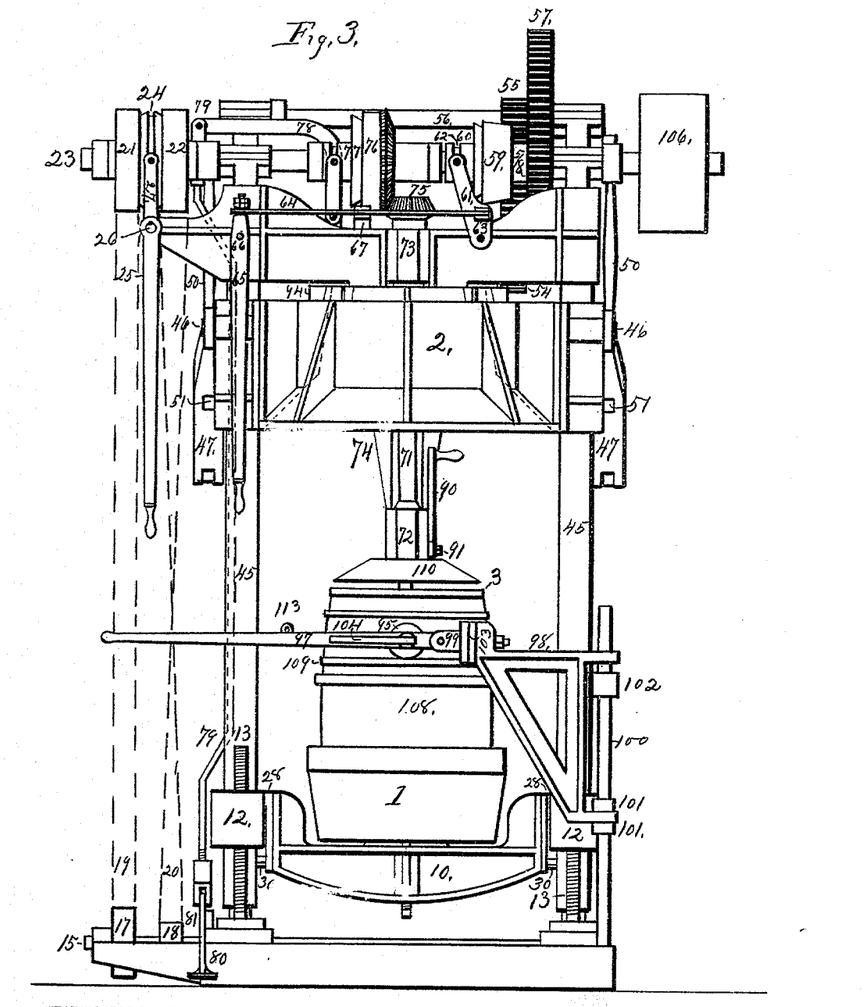
Fig. 3 is a front elevation of the machine.
Figure 4:
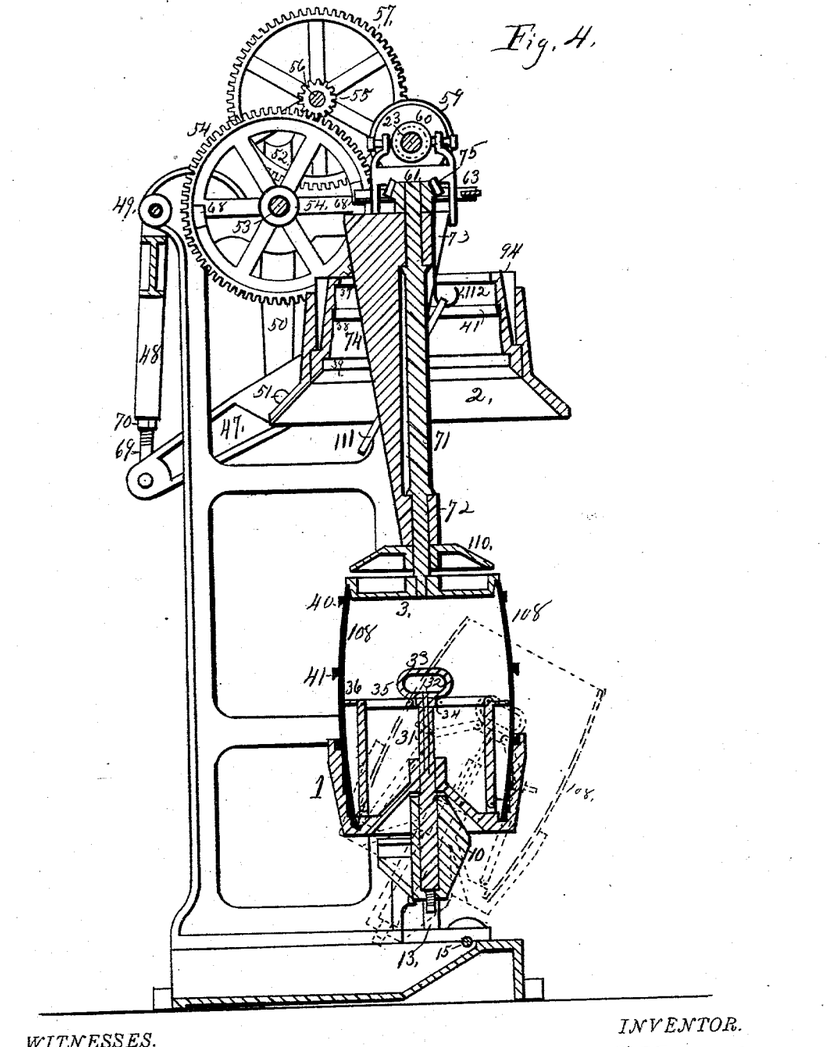
Fig. 4 is a vertical sectional view taken centrally through the barrel and at right angles to the axis of the main driving-shaft, and showing by dotted lines the position of the setting-up form or chuck for removing the finished barrel.

To make a metallic-hooped barrel I start with the bell-shaped contractor 2 at its upper position and the setting-up form or chuck 1 in a vertical position. The truss-hoops 7, 8, and 9 are then placed in position on the shoulders in the chuck 1, the hoop 8 being secured in place by the set-screws 115. The other two hoops 7 and 9 are left loose. The truss-hoops 40, 41, and 42 are next placed in their respective recesses in the contractor 2, hoop 41 being secured in place by the set-screws 44 and hoops 40 and 42 held in place by the spring-catches 43. A quantity of metallic bilge-hoops are also hung upon the hook 112, so as to encircle the hanger 74, as shown in Fig. 4. The operator now sets up the staves in the chuck 1, as shown at 107 in Fig. 1, and when this is done the hand-lever 62 is pulled outward, which forces in the left-hand end of the connecting-lever 64 and draws out the bolt 63 in the shifter 61, so that the rear end is free from the top 68 on the gear-wheel 54. The lever is then moved to the left, and this forces the friction-clutch section 60 into contact with the friction-flange 59 on the loose pinion 58 and causes the train of gearing and the cranks 52 to revolve, which they continue to do until the contractor 2 has reached its lower position, when the stop 68 on the gear 54 comes in contact with the rear end of the bolt 63 and releases the friction-clutch section 60. The contractor 2 in its descent comes in contact with the loose upper ends of the staves, as shown in Fig. 1, and continuing down draws them together within the truss-hoops 40, 41, and 42, as shown by the dotted lines 108 in Figs. 1 and 10. The cutter-head 3 is then caused to rotate by pressing down the foot-lever 80, which throws the friction-clutch 77 into contact with the loose bevel-gear 76, and the operator then throws the hand-lever 25 to the right to place the friction-wheel 24 in contact with the loose pulley 21. This rotates the worm-shaft 15 and the screws 13 in the proper direction to raise the chuck 1 and forces the barrel tighter into the upper truss-hoops, at the same time bringing the end of the barrel into contact with the rotating cutter-head 3, the knives of which joint off and chamfer the end of the barrel, as at 117, Fig. 10. As soon as the barrel is drawn tight and the upper ends of the staves are jointed off level the operator grasps the cam-lever 90 and draws it forward, thereby pressing down the sliding flange 88, which in turn forces the tool-block 86, with its crozing-knives 84 and 85, outwardly against the staves to cut the croze, as at 118, Fig. 10. The operator then removes foot-pressure from the lever 80 and stops the cutter-head 3, and by means of the lever 65 engages the friction-clutch 60 with the loose pinion 58 to raise the bell-shaped contractor 2 to its upper position. The contractor carries with it the truss-hoop 41, which is secured in its place in said contractor by the set-screws 44, and as the truss-hoops 40 and 42 are only held in place by the spring-latches 43 they are left upon the barrel, as shown in Fig. 4. By grasping the front side of the straight belt 19 and pulling down upon it the barrel is forced upward tight against the shoulder of the cutter-head 3 in such a manner that when the cutter-head is again rotated the barrel and chuck 1 revolve with it. The next operation is to smooth the surface of the barrel at the place where the metallic bilge-hoop is to be driven on. This is done by holding against the barrel while it revolves a flexible belt or band 119, coated with sand or other abrasive material, and fastened at one end to the frame of the machine and having at the other end a handle 120 for manipulating it. This removes the sharp corners from the edges of the staves and reduces the exterior of the barrel at that point more nearly to a true circle. The next hoop 111 is now taken from the hook 42 and placed over the end of the barrel and driven tight on by the hoop-driver roller 95, which is held against the rotating barrel and in contact with the top edge of the hoop 109 by the lever 97, as shown in Figs. 3 and 9, in such a manner that it rolls upon the edge of the hoop as the barrel revolves and gradually drives it to its place. The barrel is now removed from the machine by swinging the shifter-lever 25 to the left to lower the chuck 1 and the barrel away from the cutter-head 3. As soon as the barrel is lowered sufficiently to pass below the cutter-head the yoke 10 and chuck 1 are inclined forward by the studs 30 and guide-plates 28 until the upper end of the barrel is entirely out from under the cutter-head 3. Then by pulling upward on the handle 33 the inside central support 32 to 36 is collapsed, as shown by the dotted lines in Figs. 4 and 10, and the barrel may be withdrawn with one end finished and one bilge-hoop on, while the lower end is only loosely held together by the truss-hoops 7 and 8. The barrel is then replaced in the chuck 1 in an inverted position, with the finished end down, and the central support 32 to 36 is pressed down and out against the inside of the bilge. It is now righted up and raised nearly to the cutter-head 3 by swinging the lever 25 to the right and the contractor 2 is lowered over it. The jointing, chamfering, crozing, sanding, and driving of the hoop on the opposite end are now proceeded with precisely as was done to the first end, as before described. The barrel is then removed from the machine with two permanent metallic bilge-hoops 109 and two truss-hoops 40 and 9, one upon each end or chine, when it is ready to be headed up and have the permanent chine-hoops driven on by hand. The bilge truss-hoops 7 and 42 are loosened in the process of driving the permanent bilge-hoops, so that they fall off of the barrel on removal from the machine.

To make wooden-hooped barrels the truss-hoops 7 and 9 are fastened in place in the chuck 1 by the set-screws 115 and the truss-hoop 8 is left loose therein. The truss-hoops 40 and 42 are also secured in the contractor 2 by the set-screws 44, while the truss-hoop 41 is held in place by the spring-catches 43. The process of setting up, drawing together or windlassing, chamfering, jointing or leveling, and crozing is then proceeded with precisely as in making metallic-hooped barrels; but no permanent hoop is driven on the barrel while it is in the machine. The barrel is discharged from the machine with two truss-hoops, one on each end, holding it firmly together while it is being headed up and the wooden hoops are being driven on by hand. The size of the truss-hoops 8 and 41 and their location upon the barrel are such that the permanent wooden bilge-hoops may be readily driven over them into place, while the chine-hoops may also be driven on and still allow the truss-hoops to be removed over them after the barrel is completed.

The sand-belt 119 may be used to smooth the entire surface of the barrel, if desired, in which case a better arrangement is to attach one end of it to a ring slidable loosely upon the post 100, as this allows a greater range of motion vertically.

Figure 11:
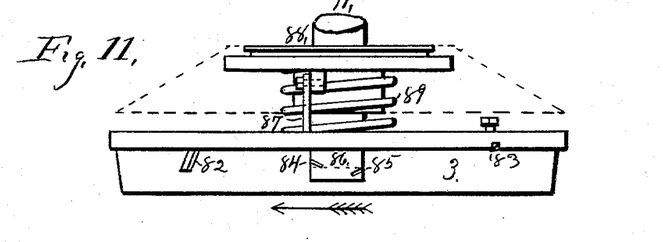
Fig. 11 is a detail enlarged side elevation of the cutter-head.
Figure 12:
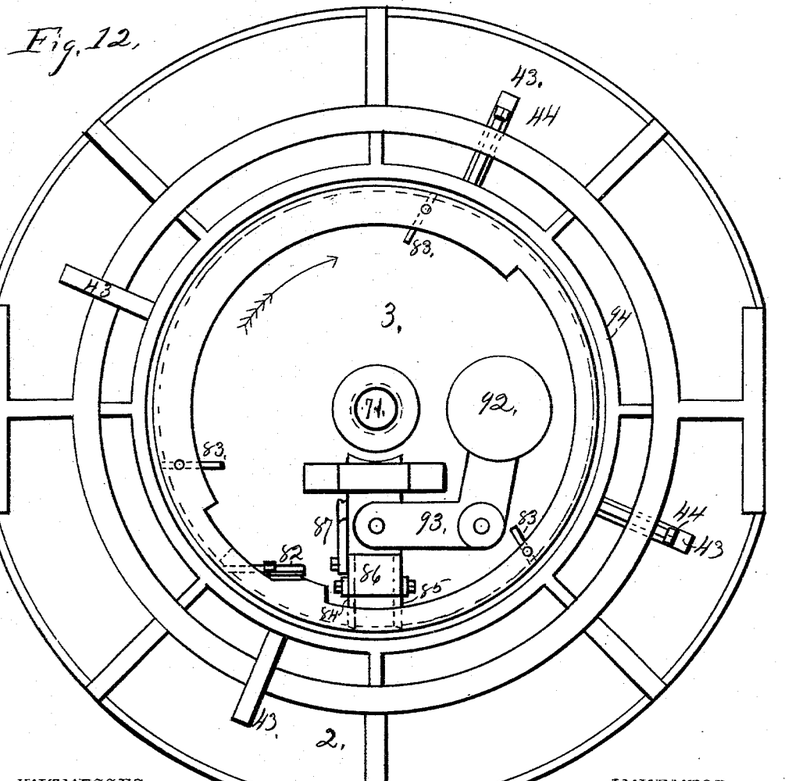
Fig. 12 is an enlarged plan view of the cutter-head and the bell-shaped contractor.
Figure 13:
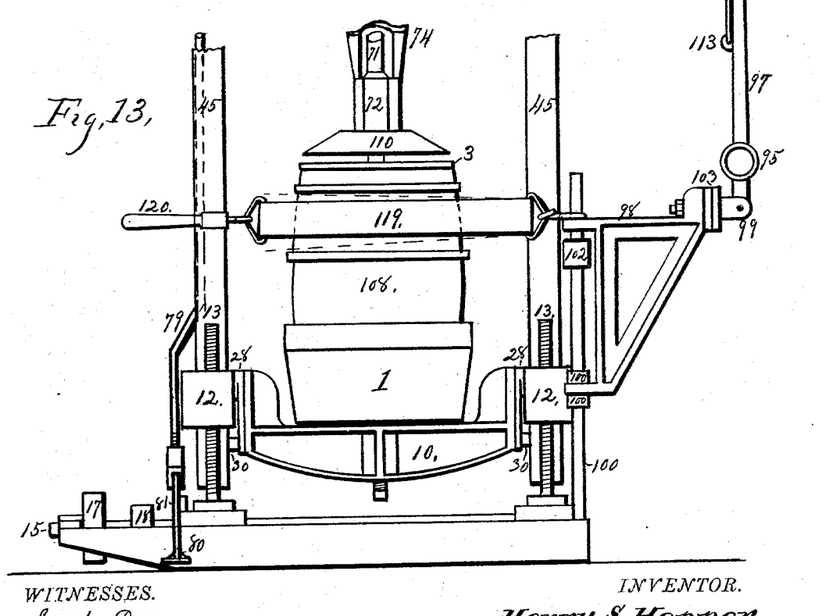
Fig. 13 is a detail front side elevation to show the sand-belt applied to the barrel.
Figure 14:
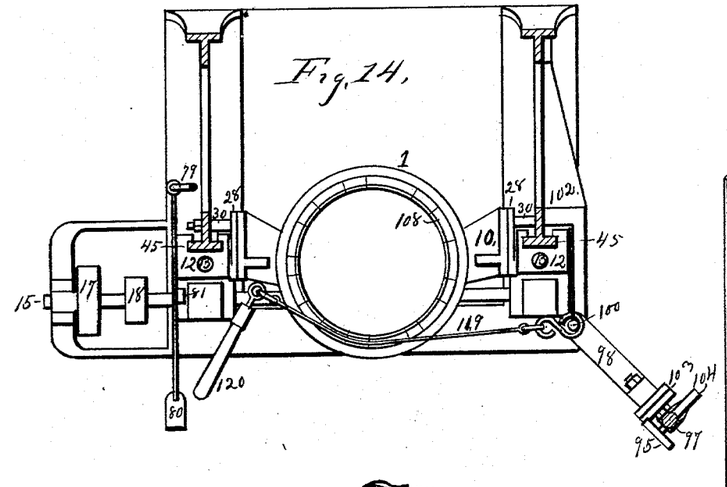
Fig. 14 is a horizontal sectional view of the same.

In Figs. 11 and 12 the cutter-head 3 revolves in the direction indicated by the arrows and the knives are shown in detail. The jointer-knives 83 are held in place in their respective slots by set-screws. The chamfering-knife 82 is held in place by the cap-screw passing through a slot in it, and, as shown in Fig. 11, it has its lower edge somewhat in advance of its upper edge, which causes it to make a drawing cut toward the ends of the staves. The crozer-knives 84 and 85 are secured in their respective inclined slots in the tool-block 86 by cap-screws and washers bearing against their projecting sides. The knives are made from straight pieces of bar-steel, with their cutting-edges running diagonally across their projecting outer ends. The cutting-edge of the forward knife 84 is upon its lower side and that of the rear knife 85 is upon its upper side. The cutting-edge of each crozer-knife commences at its forward edge, even with the outer end surface of the tool-block 86, and extends diagonally across its end until it projects just the depth of the croze at its rear edge. The projecting points on the rear edge of both knives are in line and describe exactly the same circle. The forward end of the cutting-edge of the forward knife 84 is above the circle described by its projecting rear point, and the forward end of the cutting-edge of the rear knife 85 is below the same circle. Thus the forward crozer-knife 84 cuts from the upper edge to the center of the croze, while the following knife 85 cuts from the lower edge to the center of the croze, both with a drawing cut from the edge to the center of the croze.

Figure 15:
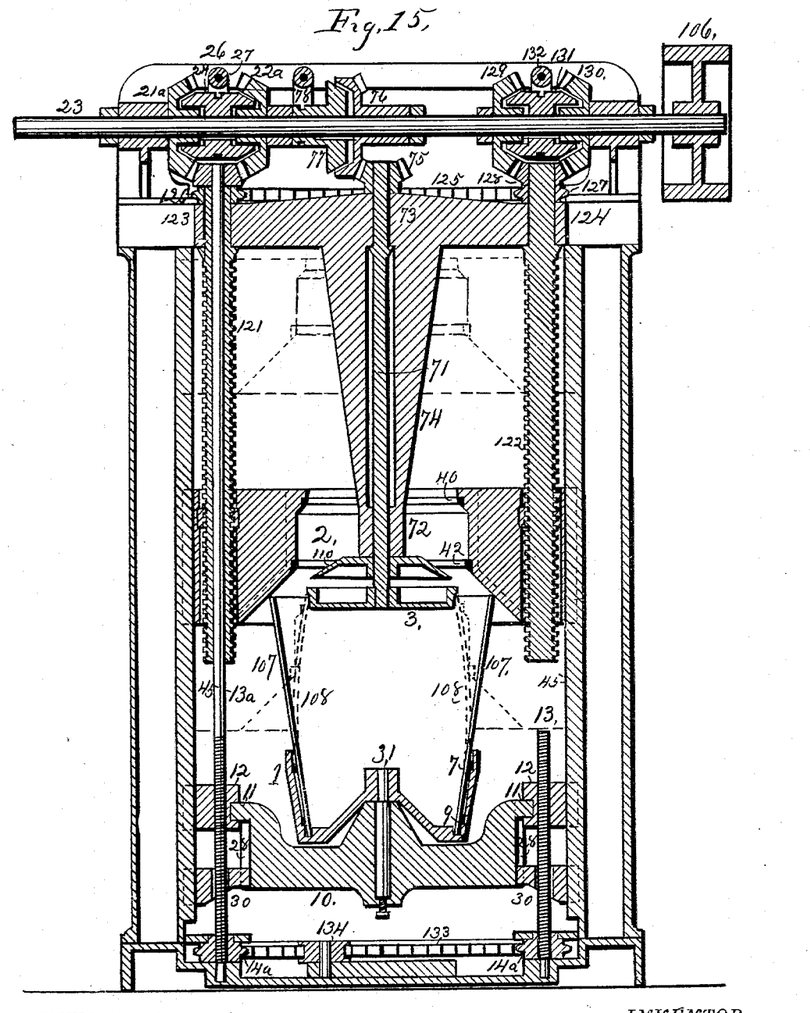
Fig. 15 is a detail vertical sectional view showing a modification of the invention.

In Fig. 15 is shown a modified form of my machine, differing only from that first described in the manner of applying power to operate the parts, which are the same in both machines. In the modification the bell-shaped contractor 2 is supported by two vertical screws 121 and 122, running in nuts attached thereto, and these screws are journaled on and suspended from the frame of the machine, as at 123 and 124. The screws are connected to rotate in unison by means of the chain 125 and the sprocket-wheels 126 and 127, attached to their upper ends. The bevel-pinion 128 is rigidly attached to the upper end of the screw 122 and meshes with two loose bevel-gears 129 and 130, mounted upon the main driving-shaft 23. Between the gears 129 and 130 is a friction-wheel 131, adapted to rotate with the main shaft 23, but free to move lengthwise thereof to engage frictionally with either of the loose bevel-gears 129 and 130 to rotate the screws in either direction and thereby raise or lower the contractor 2. The nuts 12, in which the rocking yoke 10 is fulcrumed, are supported on vertical screws 13 and 13ª, connected to rotate in unison by the attached sprocket-wheels 14ª and chain 133. An idler 134 is adapted to tighten the chain 131. The screw 13ª extends upward through the hollow screw 121 and has a bevel-pinion 135 attached at its upper end, which engages two loose bevel-gears 21ª and 22ª, mounted upon the main driving-shaft 23. A friction-wheel 24 is adapted to rotate with the main shaft and to slide lengthwise thereof, so as to frictionally engage the bevel-gears 21ª 22ª and thereby rotate the screws 13 and 13ª in either direction to raise or lower the chuck 1. The friction-clutches 24 and 134 are operated by the shifters 27 and 132, respectively, which are connected to convenient hand-levers, similar to those in use in the other form of machine. The cutter-head 3, vertical shaft 71, bevel-gears 75 and 76, friction-clutch 77, and shifter 78, connected to suitable foot-lever, are all the same as hereinbefore described. Only two truss-hoops 7 and 9 are shown in the chuck 1, and also only two truss-hoops 40 and 42 are shown in the bell-shaped contractor 2. These hoops are the ones used in making metallic-hooped barrels, the others being omitted in order to simplify the drawings and avoid confusing lines, and for the same reason the collapsible central support 32 to 36 is not shown. The operation of this machine is precisely the same as the first form described above.

What I claim as new and of my own invention is—

1. In a barrel lathe, the combination of a setting-up-form or chuck, a hollow bell-shaped contractor, vertical guides on which the contractor is movable, a stave-forming cutter-head which rotates upon a vertical shaft, supported upon journals located above said cutter-head and between the vertical guides, the latter extending above the cutter-head to permit the bell-shaped contractor to be raised above said cutter-head, substantially as described.

2. In a barrel lathe, the combination with a freely rotatable setting-up-form or chuck, of a rotary cutter-head adapted to fit into and form the end of the barrel and which is provided with a projecting flange or shoulder for pressing against the end of the staves to cause the barrel to revolve with the setting-up-form or chuck, substantially as and for the purpose described.

3. In a barrel lathe, the combination with a cutter-head for forming the ends of the staves, of a bell-shaped contractor, adapted to draw the staves together within truss-hoops, a setting-up-form or chuck, and means for holding the chuck in a vertical position during a part of its motion, while the barrel is being raised toward the cutter-head, and tilting the chuck when at its greatest distance from the cutter-head, to facilitate the removal of the barrel, substantially as described.

4. In a barrel lathe, the combination of a bell-shaped contractor, a cutter-head, a setting-up-form or chuck a vertical shaft on which the setting-up-form or chuck rotates, a yoke supporting said shaft and connected to two nuts running upon vertical screws, and means for rotating said screws, substantially as and for the purpose set forth.

5. In a barrel lathe, the combination of a bell-shaped contractor for drawing the staves together within truss-hoops, a cutter-head for forming the end of the staves a setting-up-form or chuck supported upon a yoke provided with trunnions at its ends which are each journaled in a nut running on vertical guides, and vertical screws turning in said nuts, for raising or lowering the chuck, substantially as described.

6. In a barrel lathe, the combination of a bell-shaped contractor, a cutter-head, a setting-up-form or chuck supported upon a rocking yoke provided with trunnions journaled in nuts supported by vertical screws, cam shaped guides formed in the ends of said yoke, and a stationary stud or pin attached to the frame of the machine and engaged with the said cam shaped guide for holding the chuck in a vertical position during a part of its vertical motion and tilting it during another part of its motion, substantially as described.

7. In a barrel lathe the combination with a cutter head, of a bell-shaped contractor, screws supporting said contractor one of which is tubular, a setting up form or chuck, connected screws supporting the same and one of which extends upward through the tubular contractor-supporting screw, and connected wheel gearing and friction clutches for rotating the contractor-supporting screws, substantially as described.

8. In a barrel-lathe, the combination with a bell-shaped contractor and a tilting chuck having a tubular axis, of segments 36, pivoted to said chuck at their lower ends, a bolt 32, sliding in the tubular axis of the chuck, and having a handle, and links 35, connecting said bolt with the segments 36, substantially as described.

9. In a barrel or similar lathe, the combination of a vertically adjustable swinging support, of a lever having a swivel connection therewith a roller loosely journaled in said lever, and a spring attached to said lever and bearing at its free end upon the journal of said roller, substantially as described.

10. In a barrel or similar lathe, the combination with a disk or roller journaled loosely upon a lever which is fulcrumed upon a swinging support attached to the frame of the machine, of a spring attached to said lever and bearing against the end of the journal of the disk or roller for holding the latter against the barrel with a yielding pressure and causing said disk or roller to follow the hoop closely over flat staves and other uneven parts of the barrel, substantially as described.

11. In a barrel or similar lathe, the combination with a lever fulcrumed upon the frame of the machine, of a disk or wheel attached to a spindle journaled thereon, the side of said disk being provided at its circumference with a bearing surface formed at an angle to its flat surface, and another bearing surface or tread formed upon its circumference at right angles to said first named bearing surface, substantially as described.

12. In a barrel or similar lathe, the combination with a lever fulcrumed upon the frame of the machine, of a reversible disk journaled upon said lever and provided near its circumference with a bearing surface formed at an angle to the flat surface of said disk, and another bearing surface or tread formed upon its circumference at right angles to said first named bearing surface, substantially as described.

13. In a barrel or similar lathe, the combination of a tilting setting-up-form or chuck, for one end of staves, and a progressively traveling contractor for the opposite end of the staves, substantially as described.

14. In a barrel or similar lathe, the combination of a tilting setting-up-form or chuck for one end of the staves, with a traveling contractor for the opposite end of the staves, and mechanism for applying barrel-hoops, substantially as described.

15. In a barrel-lathe the combination with a setting-up-form or chuck, a bell-shaped contractor having shoulders on its interior surface to receive one or more truss-hoops, spring-pressed latches which yieldingly engage a groove in the periphery of the truss-hoops, of set screws interchangeable with said spring-pressed latches, adapted to rigidly hold either of said truss-hoops, in the bell-shaped contractor, substantially as and for the purpose described.

In testimony whereof I have hereunto set my hand and affixed my seal in presence of two subscribing witnesses.

HENRY S. HOPPER. [L. S.]

Witnesses:
  G. H. WALDO,
  JAMES S. HOPPER.